United States Patent [19]
Berranger et al.

[11] Patent Number: 6,067,576
[45] Date of Patent: May 23, 2000

[54] STREAMS SERVER FOR MULTIPLEXER DRIVER

[75] Inventors: Jean-Alexis Berranger, Grenoble; Denis Roger, Varces, both of France

[73] Assignee: Hewlett-Packard Company, Palo Alto, Calif.

[21] Appl. No.: 08/494,318

[22] Filed: Jun. 23, 1995

[51] Int. Cl.[7] .............................. G06F 9/00; G06F 9/45; G06F 15/163

[52] U.S. Cl. ............................................................ 709/301

[58] Field of Search .................... 395/681, 680; 709/301, 300

[56] References Cited

U.S. PATENT DOCUMENTS

| | | | |
|---|---|---|---|
| 5,060,140 | 10/1991 | Brown et al. | 364/281.3 |
| 5,175,855 | 12/1992 | Putnam et al. | 395/680 |
| 5,339,413 | 8/1994 | Koval et al. | 395/680 |
| 5,513,328 | 4/1996 | Christofferson | 395/680 |

OTHER PUBLICATIONS

W. Richard Stevens, Unix Network Programming, Prentice Hall Software Series, pp. 374–389, 1990.

AT&T UNIX System V/386 Release 3.2 Prentice Hall—entire volume.

*Primary Examiner*—Alvin E. Oberley
*Assistant Examiner*—Peter Stecher

[57] ABSTRACT

A computer system is provided with an operating system that has a streams mechanism for providing streams between user-space processes and drivers. This mechanism permits a user-space process to set up a multiplexer driver for multiplexing and demultiplexing streams. To facilitate the dynamic allocation of new streams to the multiplexer driver, a stream server is associated with the multiplexer driver, the stream server keeping a pool of available streams from which it satisfies any requests for more streams made by the multiplexer driver. The stream server can request a special user-space process to supply new streams to top up the pool.

7 Claims, 7 Drawing Sheets

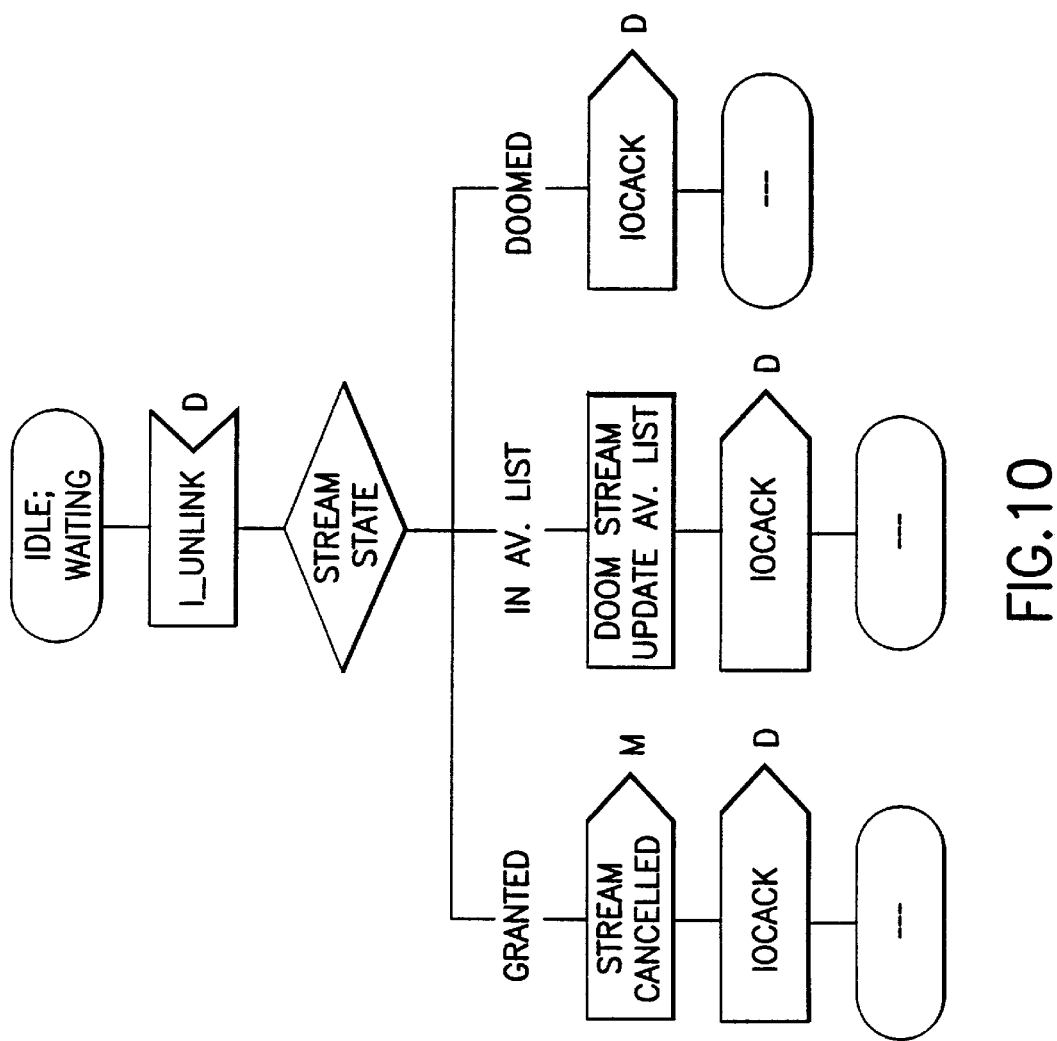
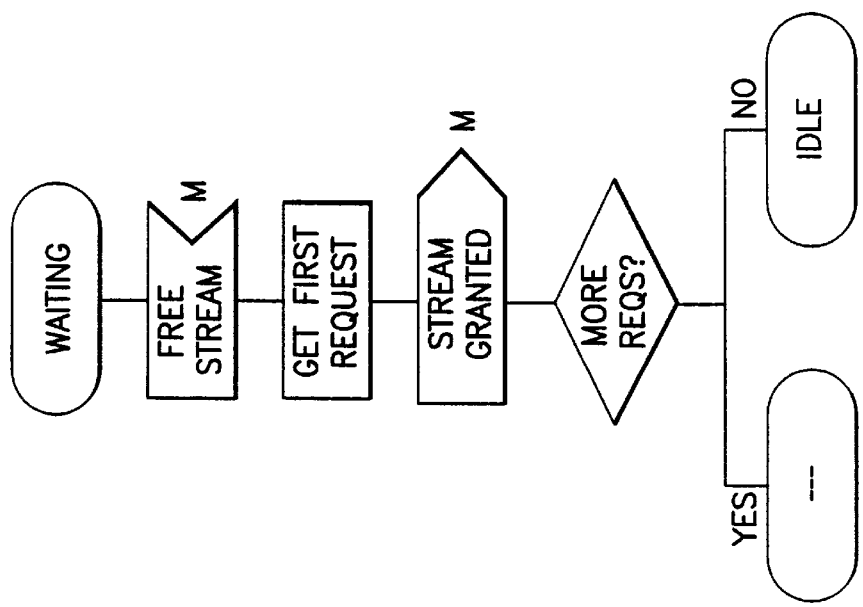

STREAMS SERVER FOR MULTIPLEXER DRIVER

FIELD OF THE INVENTION

The present invention relates to the provision of streams to a multiplexer driver in a computer system having an operating system supporting I/O streams.

BACKGROUND OF THE INVENTION

Current implementations of UNIX-related operating systems provide a kernel mechanism known as "STREAMS" for supporting development of network services and data communication drivers. In particular, the kernel mechanism allows for the setting up of a "stream" between a user-space process and a driver; a "stream" is a full-duplex processing and data transfer path in the operating system kernel between the user-space process and driver.

The STREAMS mechanism is well documented and a good introduction to the subject may be found, for example, in "UNIX System V/386, Release 3.2, Streams Primer" AT&T, published by Prentice Hall, 1989. Nevertheless, to facilitate an understanding of the present invention without reference to other documents, a brief description of the components of a stream and of the connection of a stream to a multiplexer driver will now be given with reference to FIGS. 1 and 2 of the accompanying drawings.

FIG. 1 is a diagrammatic illustration of the basic components of a stream 10. As already noted, a stream is a full-duplex processing and data transfer path between a driver 11 in kernel space and a user process 12 in user space. A stream will always have a stream head 13 and a stream end, the latter being constituted by the driver 11. The stream head 13 provides the interface between the stream 10 and the user-space process 12 and its main function is to process streams-related user system calls. The stream end driver may be a device driver providing services to an external I/O device or an internal, "pseudo" device driver such as a multiplexer driver.

In addition to its stream head and stream end, a stream may have one or more modules 15 inserted between the stream head and stream end and serving to perform intermediate processing of data.

Data is passed from the driver 11 to the user-space process 12 and from the user-space process 12 to the driver 11 in messages.

The opening, control and closing of a stream is effected by the user-space process by issuing system calls which are serviced by a kernel mechanism represented in FIG. 1 by the streams control block 16. Thus, to form the FIG. 1 stream, the user-space process 12 must first issue a system call (an "open" call) requesting the streams control block 16 to open a stream between the user-space process and the driver 11, and then issue another system call (an ioctl "push" call) to add the module 15 to the stream. The ioctl push call is actually processed by the stream head 13 which uses the services of the block 16 to execute the push.

FIG. 2 shows a more complicated streams example; it should be noted that in this FIG. (and also in subsequent FIGS.) the full-duplex nature of a stream is indicated by double-headed arrows used between the stream components rather than the more explicit separate up and down paths shown in FIG. 1. Furthermore, for clarity the streams control block has been omitted.

In FIG. 2, a plurality of streams are interconnected by a multiplexer driver 20. The multiplexer driver 20 shown is a lower multiplexer in that it multiplexes multiple lower streams 21, 22, 23 (that is, streams nearer device drivers) into a single upper stream 24 (the stream nearer the user-space process); upper multiplexers are also possible in which multiple upper streams are multiplexed into a single lower stream. Whether an upper or a lower multiplexer, the multiplexer driver 20 comprises a functional entity that serves to multiplex/demultiplex the streams operationally associated with it.

To form the FIG. 2 arrangement, the user-space process 12 first issues system calls to open streams 21, 22 and 23 to each of the device drivers 11A,B,C and stream 24 to the multiplexer driver 20. Next, the user-space process 12 issues push system calls to push the required modules 15A,B,C onto streams 21, 22 and 24. Finally, the user-space process issues appropriate ioctl calls to link the streams 21, 22 and 23 below the multiplexer driver 20.

The present invention relates to a computer system provided with an operating system having a streams facility generally of the form described above. More particularly, the present invention relates to a computer system of the type having operating system means for providing system resources to user-space processes run by the computer system, the operating system means including a device driver; a multiplexer driver comprising a multiplexer functional entity for multiplexing/demultiplexing streams operationally associated therewith; and stream-control means for opening a stream between a said user-space process and said device driver in response to a first system call from said user-space process, and for linking a said stream previously opened between said user-space process and device driver, to said multiplexer driver in response to a second system call from said user-space process.

A drawback of the known streams multiplexer arrangements is that the dynamic provision of extra streams to the multiplexer driver must be controlled by the user-space process served by the multiplexer driver. This generally requires each application to have specially written code to provide this facility.

It is an object of the present invention to provide an improved way of enabling the dynamic provision of extra streams to a multiplexer driver in a computer system of the aforesaid type.

SUMMARY OF THE INVENTION

According to the present invention, there is provided, in a computer system of the aforesaid type, the improvement wherein:

the multiplexer driver further comprises a stream server for providing streams for operational use by said multiplexer functional entity when needed, the stream server including messaging means for issuing a new-stream request towards a said user-space process, and a streams supplier is provided in the form of a user-space process for receiving a said new-stream request, the stream supplier being responsive to a said new-stream request to cause at least one stream to be opened and then linked to the multiplexer driver such as to be at the disposition of the stream server for provision to the multiplexer functional entity.

Preferably, the multiplexer functional entity is operative to issue a get-stream request to the stream server when needing another stream, and the stream server further includes a pool manager for maintaining a pool of at least one stream available to be provided to the multiplexer functional entity, and provider means responsive to a get-stream request to provide a stream from the pool to the multiplex functional entity.

The pool manager may also be arranged to receive back into the pool any stream no longer operationally needed by the multiplexer functional entity.

In the preferred embodiment, the pool manager seeks to maintain the number of streams in the pool betweem upper and lower thresholds.

Advantageously, the provider means includes request-storage means for storing a get-stream request when the pool is temporarily empty of streams, the provider means being responsive to a stream being provided to the pool by the stream supplier to check the request-storage means and fullfil any get-stream request found stored in the request-storage means. The request-storage means is preferably capable of storing multiple get-stream requests, the provider means being operative to fullfil stored requests in a first-in, first-out order.

Communication between the stream server and stream supplier can most readily be effected by means of a stream provided between the multiplexer driver and the stream supplier.

BRIEF DESCRIPTION OF THE DRAWINGS

A multiplexer stream-server arrangement embodying the invention will now be described, by way of non-limiting example, with reference to the accompanying diagrammatic drawings, in which:

FIGS. 4 to 10 are SDL-type diagrams illustrating the state transitions of the FIG. 3 stream server in response to messages received thereby.

BEST MODE OF CARRYING OUT THE INVENTION

Figure 1:
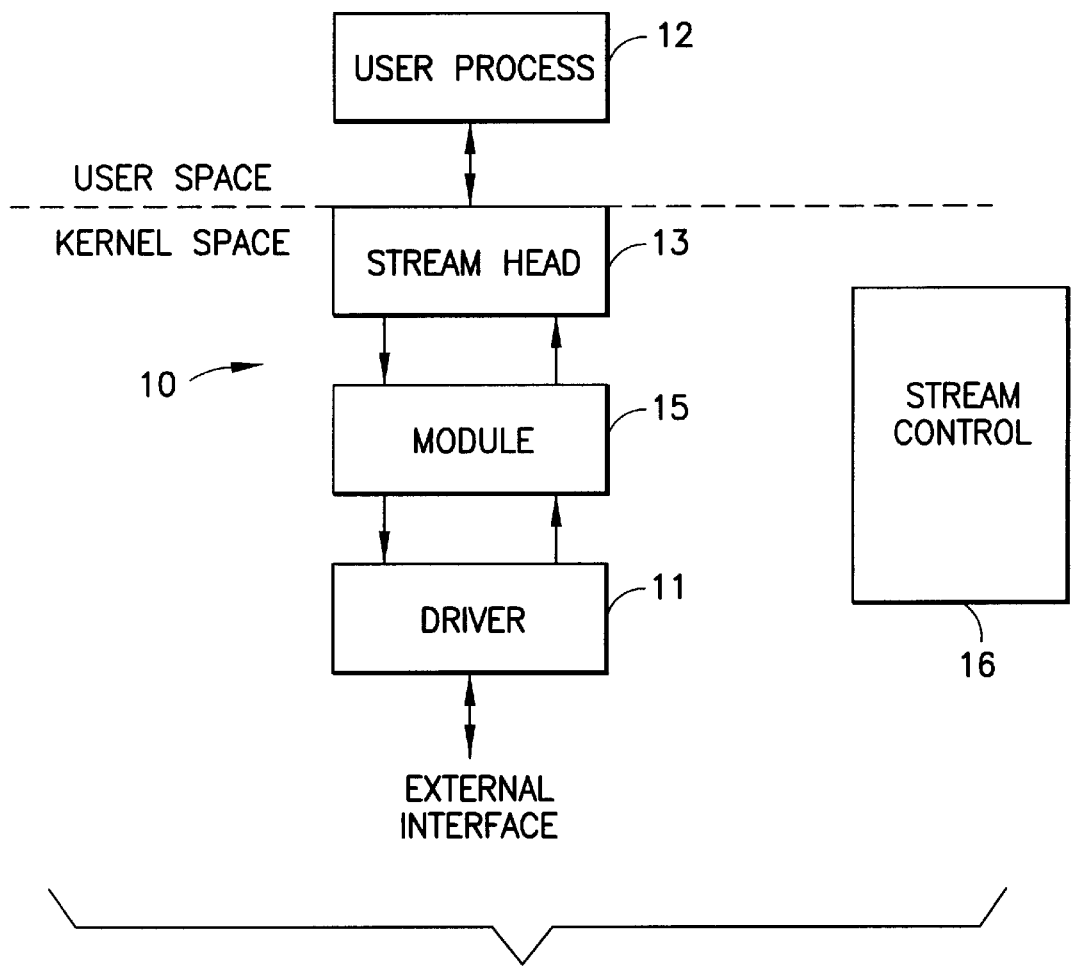
FIG. 1 is a diagram of a known I/O stream arrangement provided in the kernel space of a computer operating system.
Figure 2:
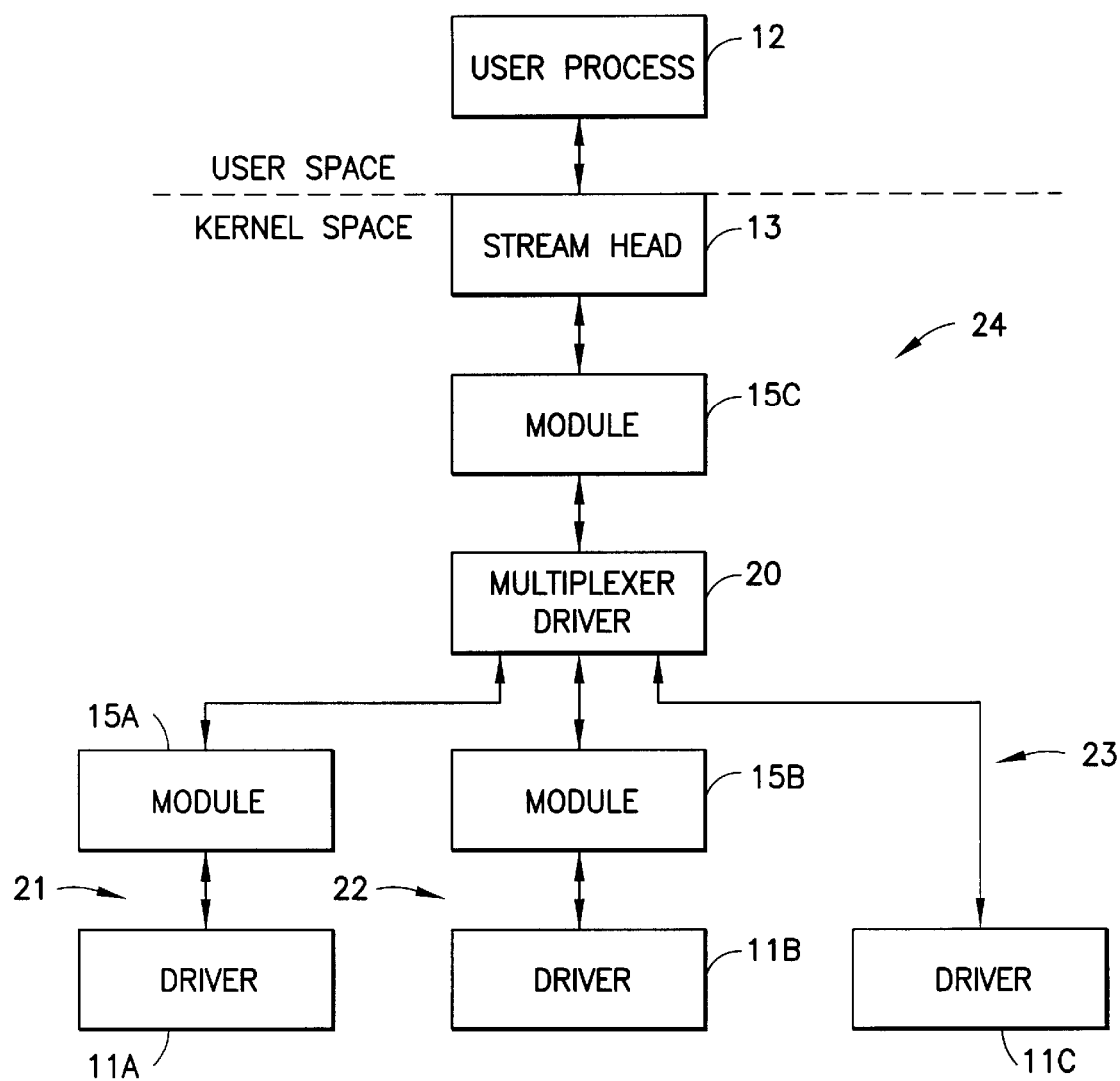
FIG. 2 is a diagram of a known streams configuration using a lower multiplexer driver.
Figure 3:
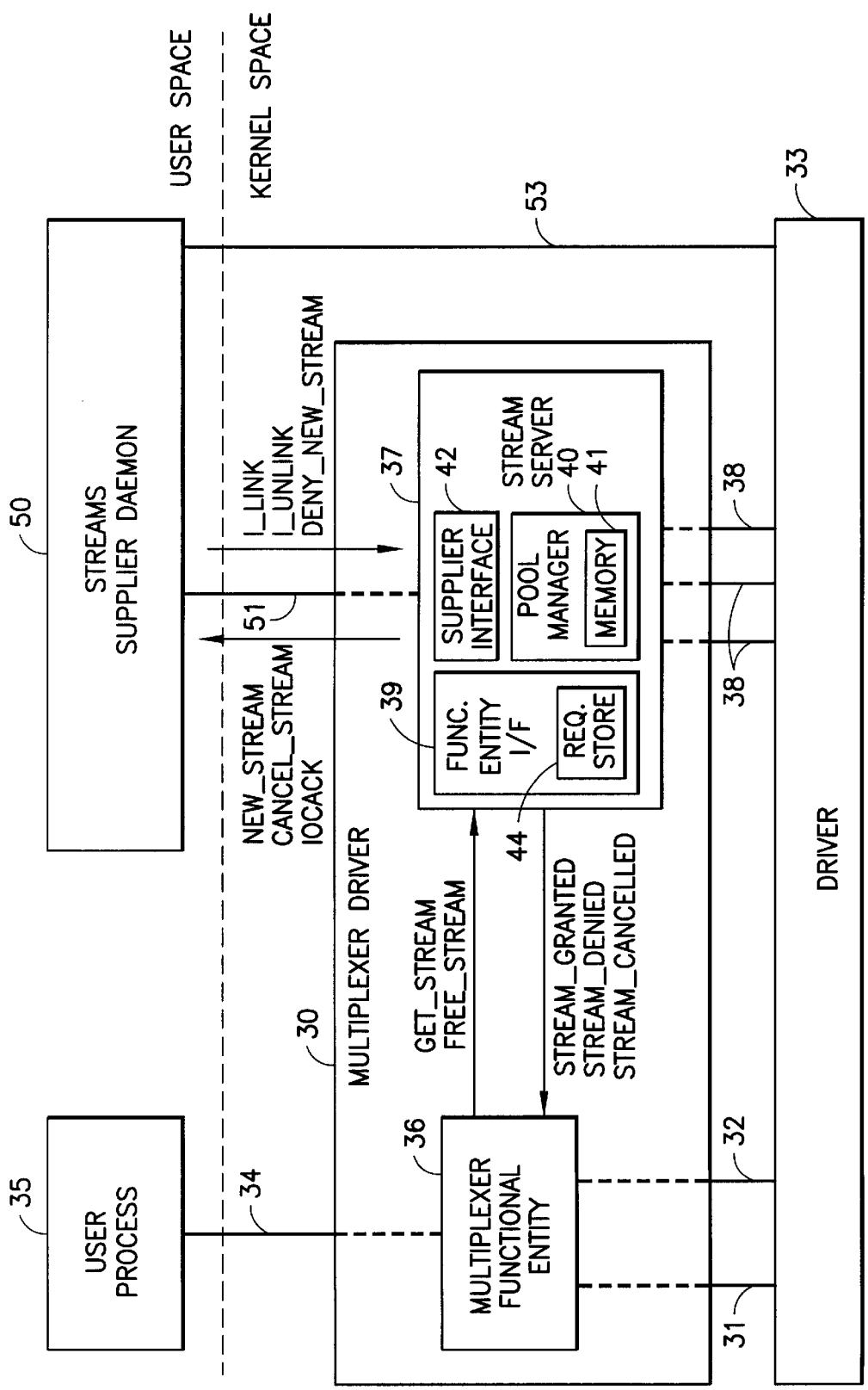
FIG. 3 is a diagram of a lower multiplexer driver provided with a stream server in accordance with the present invention.

FIG. 3 shows an embodiment of the present invention where a multiplexer driver 30 serves as a lower multiplexer multiplexing lower streams 31, 32 connected to a device driver 33, into a single stream 34 connected to a user process 35. The multiplexing/demultiplexing functionality is provided by a functional entity 36 of the multiplexer driver 30, the streams 31, 32 and 34 being operatively associated with this entity 36. For clarity, the streams are represented by thick lines.

The multiplexer functional entity 36 has the ability to dynamically increase or decrease the number of lower streams it is handling according to operational requirements. For example, the entity 30 may be asked to handle a new external interface via the driver 33 by adding a new lower stream.

To enable the multiplexer functional entity 36 to increase or decrease the number of lower streams operatively associated with it, without involving the user process 35 handling the upper stream 34, the multiplexer driver 30 is provided with a stream server 37 which maintains a pool of available lower streams 38. Whenever the entity 36 requires an additional lower stream, it sends a GET_STREAM message to the stream server 37 where an interface 39 receives the message and responds by supplying the parameters of an available stream 38 in a STREAM_GRANTED message back to the multiplexer functional entity 36; the stream identified to the entity 36 is then operatively used by the entity as a new lower stream and, of course, the stream is no longer considered to be the pool of available streams maintained by stream server 37.

When the multiplexer functional entity ceases to need a particular lower stream, it releases the stream back into the pool of streams maintained by the stream server, by passing details of the stream to the stream server in a FREE_STREAM message.

A pool manager 40 of the stream server 37 is responsible for keeping a record of which streams are in the pool of available streams 38 and which streams have been granted to the multiplexer functional entity 36 for operational use (such as streams 31, 32 in FIG. 3).

For reasons of efficiency, the pool manager seeks to maintain the number of available streams 38 in the stream pool between predetermined upper and lower thresholds held in memory 41.

This implies a need for the ability to create a new stream 38 should the number of streams in the pool fall to the lower threshold, and for the ability to remove an existing stream 38 should the number of streams in the pool reach the upper threshold. To this end a user-space streams supplier daemon (process) 50 is provided that can communicate with the stream server 37 through a stream 51 that acts as a control channel.

Upon the pool manager 40 determining that a new stream 38 is needed to top up the stream pool, it causes a supplier interface 42 of the stream server 37 to pass a NEW_STREAM message to the streams supplier daemon requesting one or more new streams. In response to this message, the daemon will use the appropriate system call to open the requested number of new streams (see stream 53) between itself and the driver 33 and then use another system call to link the or each such new stream beneath the multiplexer driver 30. Details of each new stream are communicated to the multiplexer driver 30 in an I_LINK message where they are passed to the supplier interface 42 which in turn passes them to the pool manager 40. The pool manager 40 then adds each newly created stream to the stream pool and causes an acknowledgement IOCACK to be sent back to the daemon 50.

In a similar manner, upon the pool manager 40 determining that an existing available stream 38 should be removed from the stream pool, it causes the interface 42 to send a CANCEL_STREAM message to the streams supplier daemon 50 requesting cancellation of the stream identified in the message. In response to this message, the daemon will issue a 'close' stream system call and send back an I_UNLINK message confirming closing of the stream concerned. The stream server responds with an IOCACK message and the pool manager 40 removes all of its data structures relevant to that stream. Between the sending of the CANCEL_STREAM message and the receipt of the I_UNLINK message, the pool manager 40 considers the stream concerned to have "doomed" status (in contrast to an "available" or "granted" status). It is possible that despite the efforts of the pool manager 40 always to have streams 38 available in the stream pool, the pool could become exhausted (for example, if a number of GET_STREAM requests are received in quick succession, the stream-supplier daemon may be unable to respond fast enough to the NEW_STREAMS requests issued by the stream server). To deal with this possibility, the interface 39 is arranged to store in request store 44, any GET_STREAM request that cannot be immediately granted using a stream in the pool. The store 44 is arranged to hold several requests. Whenever a stream is added to the pool, the pool manager 40 checks whether any GET_STREAM request is outstanding (stored in store 44) and, if so, this request is activated and satisfied using the new stream. If more than one request is stored in store 44, then these requests are handled in first-in, first-out order.

It may happen that the streams-supplier daemon 50 is unable to open a new stream when requested by the stream server 37. In this case, the daemon 50 will reply to the server with a DENY_NEW_STREAM message; if any GET_STREAM requests are outstanding, the stream server 37 then replies to all these requests with a STREAM_DENIED message and annuls all such requests.

Finally, the streams-supplier daemon 50 can be provided with the capability of cancelling a specific stream at the request of an outside agent. In this case, the streams supplier daemon sends an I_UNLINK message identifying the stream concerned. If the pool manager determines that the stream is an available stream in the stream pool then it simply removes the stream from its records and sends an IOCACK. However, if the stream concerned is found to be one already granted to the multiplexer functional entity 36, then a STREAM_CANCELLED message is sent to the entity 36 to cause the entity to abandon the stream, and an IOCACK message is returned to the streams supplier daemon 50.

FIGS. 4 to 10 illustrate the operation of the stream server 37 in terms of the state transitions and messaging events undergone by the server, the representation used being based on the SDL representation widely used in the telecommunications field. In the present case, the stream server is considered to have two states, namely an IDLE state in which no GET_STREAM request is outstanding, and a WAITING state in which a GET_STREAM request is waiting to be satisfied. The messaging events involved are those already discussed above and shown in FIG. 3.

In each FIGS. 4 to 10, the effect of the receipt by the stream server of a particular message is illustrated, the stream server being taken as residing in a known initial state (this state being stated in the top rounded-end box of each FIG.). The end state of the system may be the same as or different from the initial state after the sequence of events triggered by the message first received (if the end state is the same as the initial state, this is depicted by a simple dash within a rounded-end box). The receipt of a message is depicted by a box with its right-hand end arrowed inward, whilst the transmission of a message is depicted by a box with its right-hand end arrowed outward; in both cases, the adjacent letter indicates the other party involved in the message, "M" standing for the multiplexer functional entity 30 and "D" for the streams supplier daemon 50.

Figure 4:
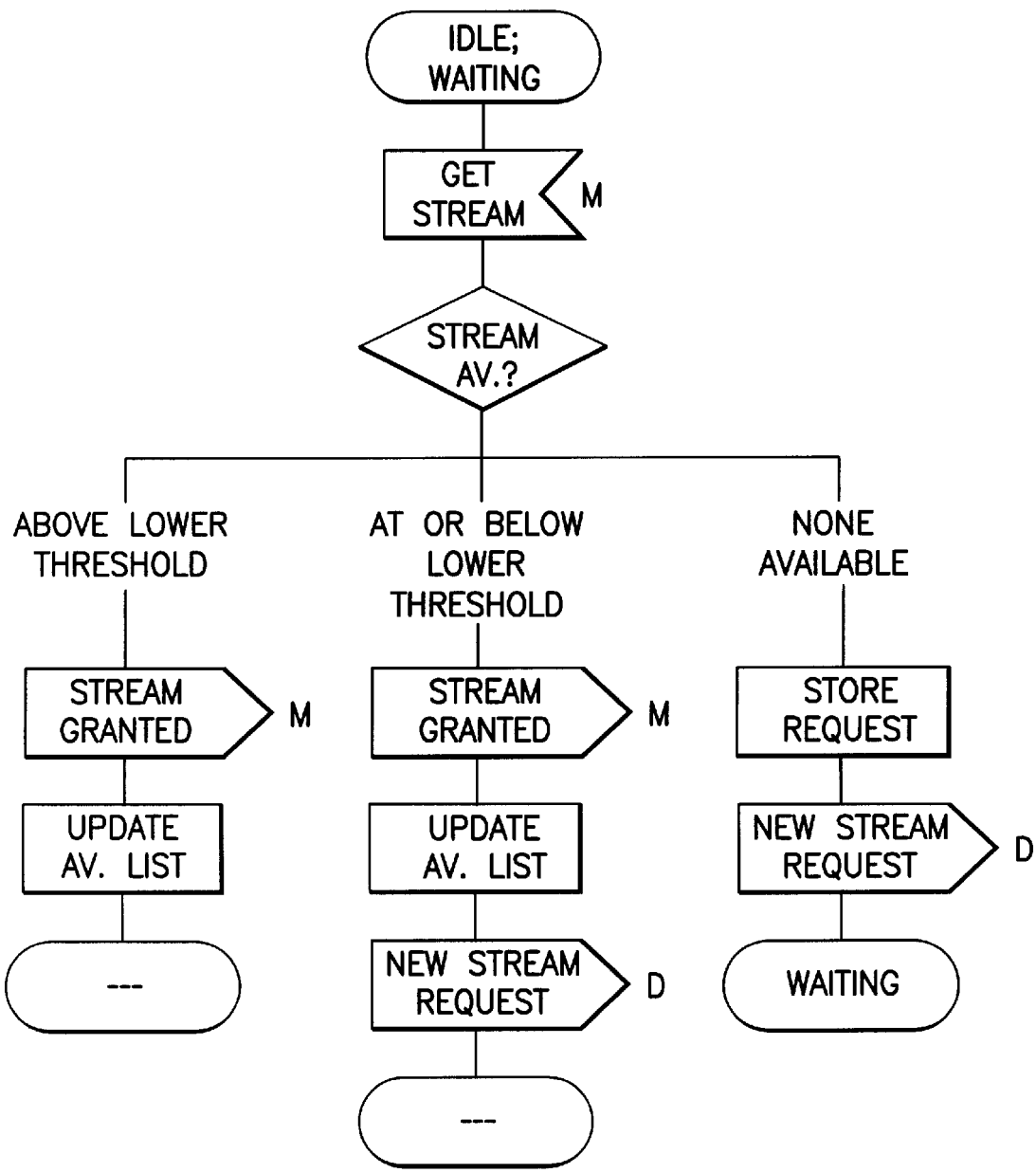

It is believed that FIGS. 4 to 10 are largely self-explanatory and that therefore a detailed textual description of each is unnecessary, and indeed, undesirable. A brief overview of each FIG. will, however be given. FIG. 4 illustrates what happens when the stream server receives a GET_STREAM message when in either of its states. The response of the stream server depends on whether the number of available streams in the stream pool is above the lower threshold (in which case the request is granted); at or below the lower threshold but not zero (in which case the request is granted but the streams supplies daemon is asked to supply one or more new streams), or equal to zero (in which case, the request is stored and the streams supplier daemon is asked to supply one or more new streams). If a stream has been granted, the record of available streams (the available or 'AV' list) maintained by the pool manager 40 is updated.

Figure 6:
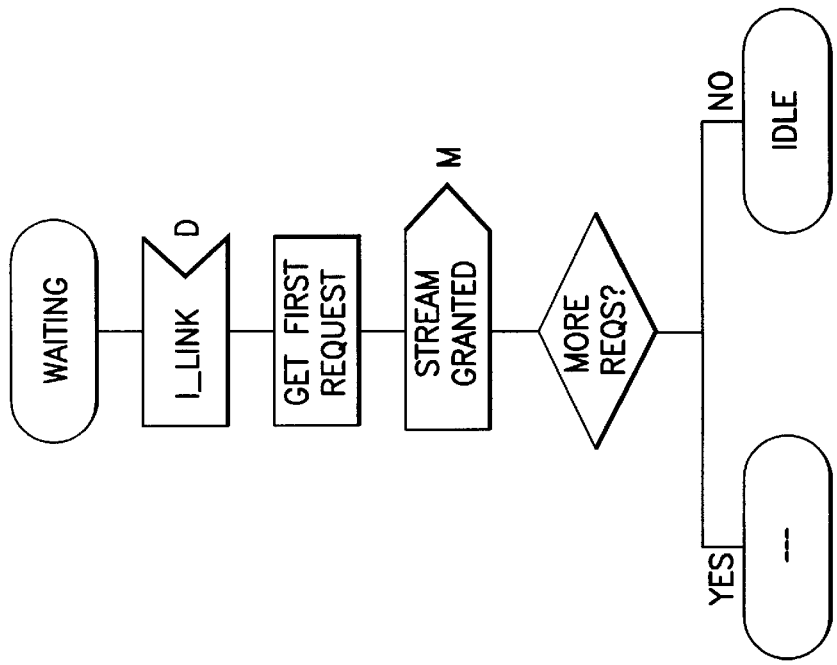
Figure 5:
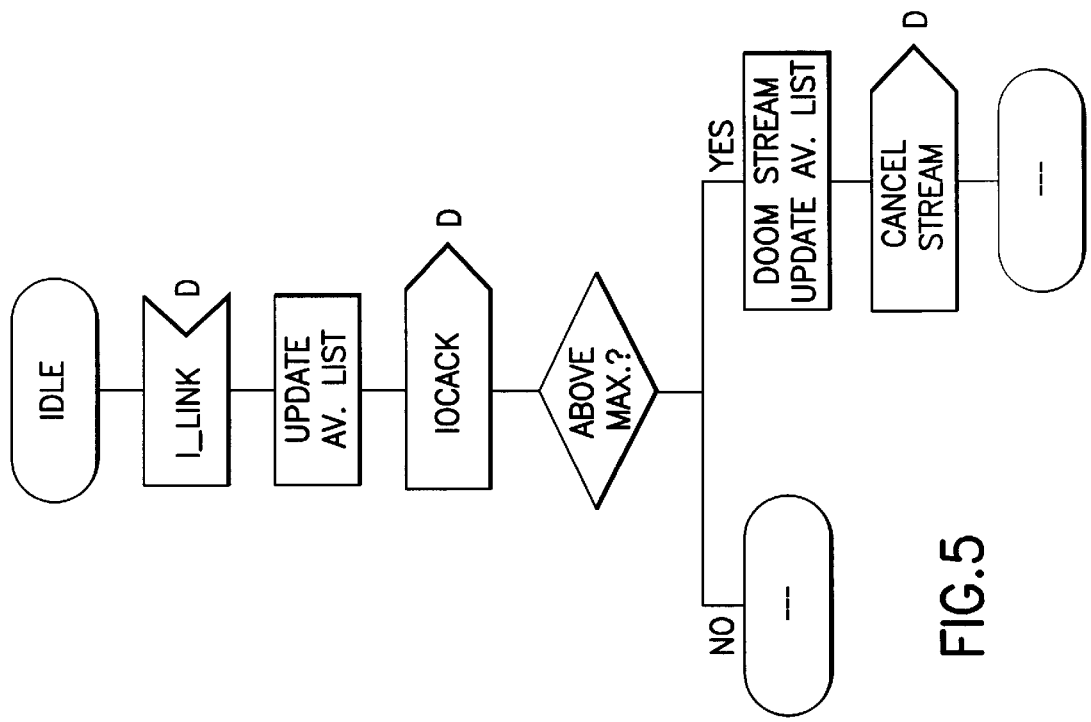

FIGS. 5 and 6 show the response of the stream server 37 to an I—LINK message from the stream supplier, FIG. 5 being for the case where the stream server is in its IDLE state and FIG. 6 being for the case where the stream server is in its WAITING state.

In the FIG. 5 case, details of the newly-created stream are recorded by the pool manager which also checks to see if its upper threshold has now been reached; if it has, an existing available stream is doomed and a CANCEL_STREAM message sent to the stream supplier daemon.

In the FIG. 6 case, when an I_LINK message is received, the longest-outstanding GET_STREAM request held in store 44 is serviced and if there are no more requests outstanding, the stream server passes to its IDLE state. If one or more requests are still outstanding, the stream server remains in its WAITING state.

Figure 7:
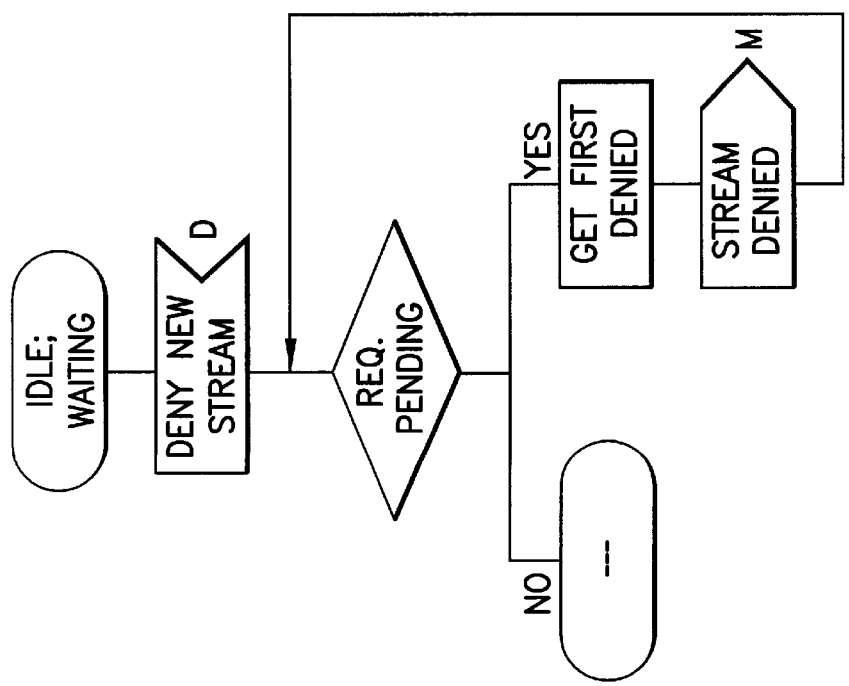

FIG. 7 concerns the situation where the streams supplier daemon returns a DENY_NEW_STREAM message after being asked for a new stream. In this case, any pending GET_STREAM requests are denied and the stream server is placed in its IDLE state.

Figure 8:
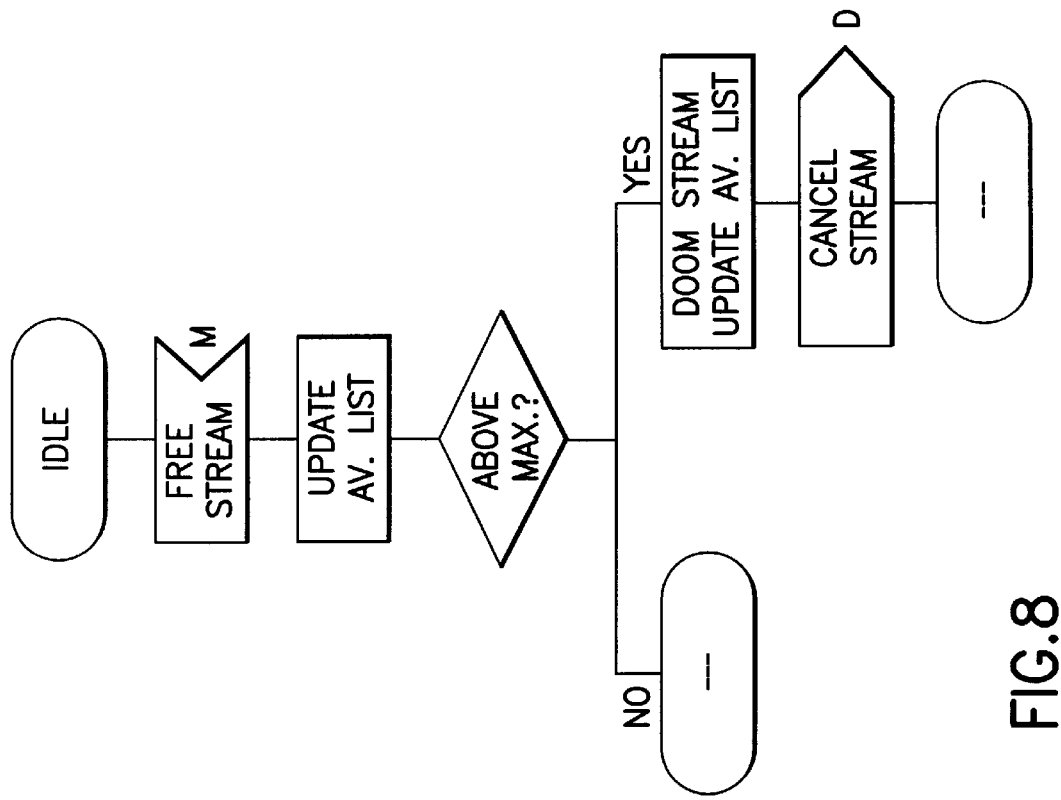

FIGS. 8 and 9 both concern the response of the stream server to a FREE_STREAM message, FIG. 8 being for the case where the server is in its IDLE state and FIG. 9 being for the case where the server is in its WAITING state.

In the FIG. 8 situation, the freed stream is recorded by the pool manager as being available. However, the pool manager also checks whether the upper threshold for streams in the stream pool has been reached; if it has, the pool manager dooms an existing available stream and sends a CANCEL_STREAM message to the streams supplier daemon.

In the FIG. 9 case, a FREE_STREAM message causes the longest-outstanding GET_STREAM request to be granted.

Finally, FIG. 10 shows the response of the stream server 37 to an I_UNLINK message in respect of a particular stream. The response of the server depends on the current stream status. If the stream is already doomed, no action is required. If the stream is available (not granted), then it is removed from the availability list and doomed. If the stream is granted, a STREAM_CANCELLED message is sent to the multiplexer functional entity 36.

In the foregoing, it has been assumed that the basic system components (multiplexer driver 30, streams supplier daemon 50, and the connecting control stream 51) are already open. The procedures for doing this are standard and will not be described herein except to note that one streams supplier daemon must be provided for each stream server instance and that it is the responsibility of the daemon to open the control stream between itself and the multiplexer driver. Preferably, also, the upper and lower thresholds for the stream pool are down-loaded to the stream server from the streams supplier daemon, and the values of these thresholds are specifiable to the daemon when the latter is opened; in this way, the threshold values can be set to values appropriate to the multiplexer driver concerned.

Various modifications to the described embodiment of the invention are, of course, possible. For example, although only a single device driver 33 is shown in FIG. 3, the lower streams could be attached to different device drivers. In this case, the streams supplier daemon would need to open new streams onto appropriate drivers 33 and the requesting and supply of streams between the multiplexer functional entity 36 and the stream server 37 would need to take account of the driver 33 required by the entity 36.

Furthermore, it would be possible to dispense with the stream pool and simply have the stream server request a new stream from the streams supplier each time a GET_STREAM request was received (similarly, the stream server would request cancellation of a stream by the streams supplier each time a stream was released by the multiplexer functional entity).

We claim:

1. In a computer system having operating system means for providing system resources to user-space processes run by the computer system, said operating system means including:

a device driver, a multiplexer driver comprising a multiplexer functional entity for multiplexing/demultiplexing streams operationally associated therewith, said multiplexer functional entity operative to issue a get-stream request when needing another said stream, and stream-control means for opening a stream between a user-space process and said device driver in response to a first system call from said user-space process, and for linking a stream previously opened between said user-space process and device driver, to said multiplexer driver in response to a second system call from said user-space process; the improvement wherein:

said multiplexer driver further comprises a stream server for providing streams for operational use by said multiplexer functional entity when needed, said stream server including (i) messaging means for issuing a new-stream request towards a user-space process, (ii) a nool manager for maintaining a pool of at least one stream available to be provided to said multiplexer functional entity, and (iii) provider means responsive to a get-stream request from said multiplexer functional entity to provide a stream from said pool to said multiplexer functional entity and a streams supplier is provided in the form of a user-space process for receiving a new-stream request, said stream supplier being responsive to said new-stream request from said stream server to cause at least one said stream to be opened and then linked to said multiplexer driver such as to be at the disposition of said stream server for provision to said multiplexer functional entity.

2. The computer system of claim 1, wherein said provider means includes request-storage means for storing a get-stream request when said pool is temporarily empty of streams, said provider means being responsive to a stream being provided to said pool by said stream supplier to check said request-storage means and fulfill any said get-stream request found stored in said request-storage means.

3. The computer system of claim 2, wherein said request-storage means is operative to store multiple get-stream requests and said provider means is operative to fullfil stored said requests in a first-in, first-out order.

4. The computer system of claim 1, wherein said pool manager of said stream server comprises:

means for storing a streams lower-threshold count, and means for comparing said streams lower-threshold count with the number of streams currently in said pool and for causing said messaging means to issue a stream request upon said number falling to a value such that said number and said streams lower-threshold count are in predetermined relation.

5. The computer system of claim 1, wherein said pool manager is operative to receive back into said pool a stream no longer operationally needed by said multiplexer functional entity.

6. The computer system of claim 5, wherein said pool manager of said stream server further comprises:

means for storing a streams upper-threshold count, means for comparing said streams upper-threshold count with the number of streams currently in said pool and, upon said number reaching a value such that said number and said streams upper-threshold count are in predetermined relation, for causing a stream to be removed from said pool and said messaging means to issue a cancel-stream request, said streams supplier being responsive to a cancel-stream request to issue a third system call to said stream-control means to cause removal of the relevant stream.

7. The computer system of claim 1, wherein a stream is provided between said multiplexer driver and said stream supplier for the passing of said new-stream requests from said stream server to said stream supplier.

* * * * *

UNITED STATES PATENT AND TRADEMARK OFFICE
CERTIFICATE OF CORRECTION

| | |
|---|---|
| PATENT NO. | : 6,067,576 |
| APPLICATION NO. | : 08/494318 |
| DATED | : May 23, 2000 |
| INVENTOR(S) | : Jean-Alexis Berranger et al. |

It is certified that error appears in the above-identified patent and that said Letters Patent is hereby corrected as shown below:

Column 4, line 60, insert paragraph break between "status)." and "It is"

Claim 1, Column 7, line 37, delete "nool" and insert therefor --pool--

Signed and Sealed this

Fourteenth Day of October, 2008

JON W. DUDAS
*Director of the United States Patent and Trademark Office*